United States Patent [19]
Stearns

[11] 3,907,224
[45] Sept. 23, 1975

[54] VARIABLE RAMP EXHAUST NOZZLE AND CLAMSHELL REVERSER

[75] Inventor: Gabriel E. Stearns, Mercer Island, Wash.

[73] Assignees: The Boeing Company, Seattle, Wash.; Aeritalia S.p.A., Naples, Italy

[22] Filed: Apr. 18, 1974

[21] Appl. No.: 462,052

Related U.S. Application Data

[62] Division of Ser. No. 365,933, June 1, 1973, Pat. No. 3,844,482.

[52] U.S. Cl. ........ 244/110 B; 239/265.37; 244/53 R
[51] Int. Cl.² .......................................... B64D 33/04
[58] Field of Search... 244/53 R, 12 B, 23 B, 110 B, 244/12 D, 23 D; 239/265.37, 265.39, 265.29

[56] References Cited
UNITED STATES PATENTS

| | | | |
|---|---|---|---|
| 2,620,622 | 12/1952 | Lundberg | 239/265.37 |
| 2,979,893 | 4/1961 | Meyer | 239/265.29 |

*Primary Examiner*—Trygve M. Blix
*Assistant Examiner*—Barry L. Kelmachter
*Attorney, Agent, or Firm*—H. Gus Hartmann; Glenn Orlob; B. A. Donahue

[57] ABSTRACT

Apparatus for varying the exhaust nozzle area and for reversing the thrust of an aircraft jet engine which is mounted on an aircraft wing so as to discharge the engine thrust flow through a D-shaped exhaust nozzle exit over the upper surface of the wing.

For varying the exhaust nozzle area, a three segment ramp is lowered for increasing the exhaust exit area during takeoff and landing of the aircraft, and for the sound suppression mode.

For thrust modulation and thrust reversing, the aft segment of the three segment ramp is rotated upwardly and forwardly from the ramp surface to a thrust flow deflecting position. Operating in combination therewith for thrust reversing is a curved or inverted U-shaped panel. For the thrust reversing mode, this curved or clamshell panel is pivoted rearwardly about a lower hinge line near the upper wing surface; thereby, exposing an opening in the upper duct wall through which the exhaust flow can be directed; provided, that the aft ramp segment is also rotated upwardly in abutment relation with the clamshell panel with the combination forming a clamshell blocker door arrangement.

The safety feature being that the aft ramp segment or blocker panel in its raised position becomes highly loaded due to deflection of the exhaust flow; and through its interconnecting linkage arrangement with the aft swinging clamshell panel, any actuator or linkage failure would cause the blocker panel to swing down from the blocked flow position thereby permitting forward thrust flow.

4 Claims, 7 Drawing Figures

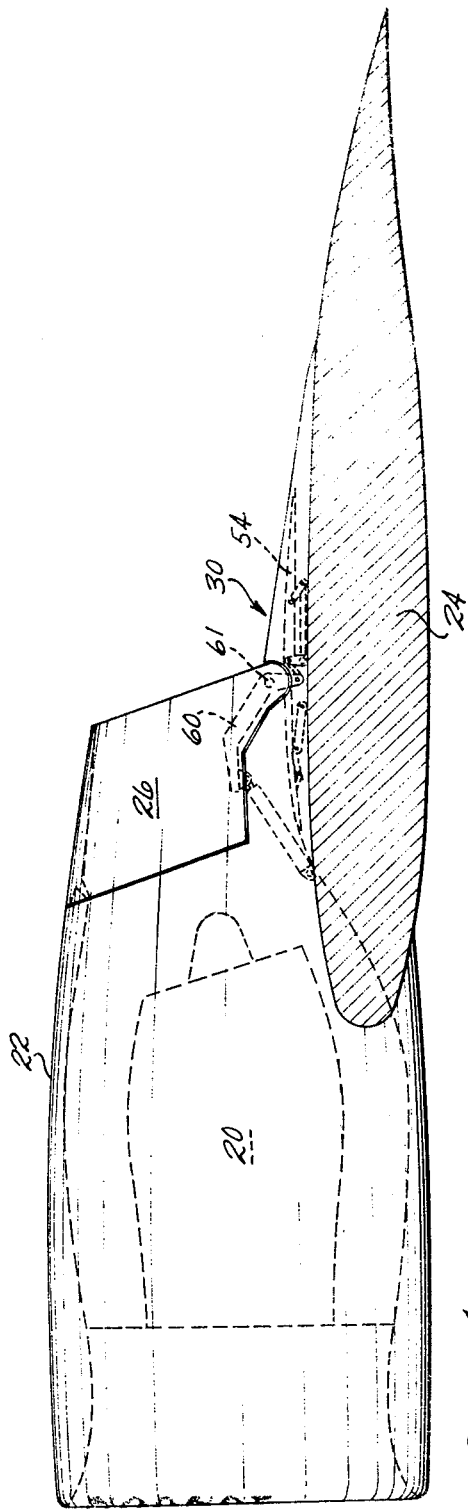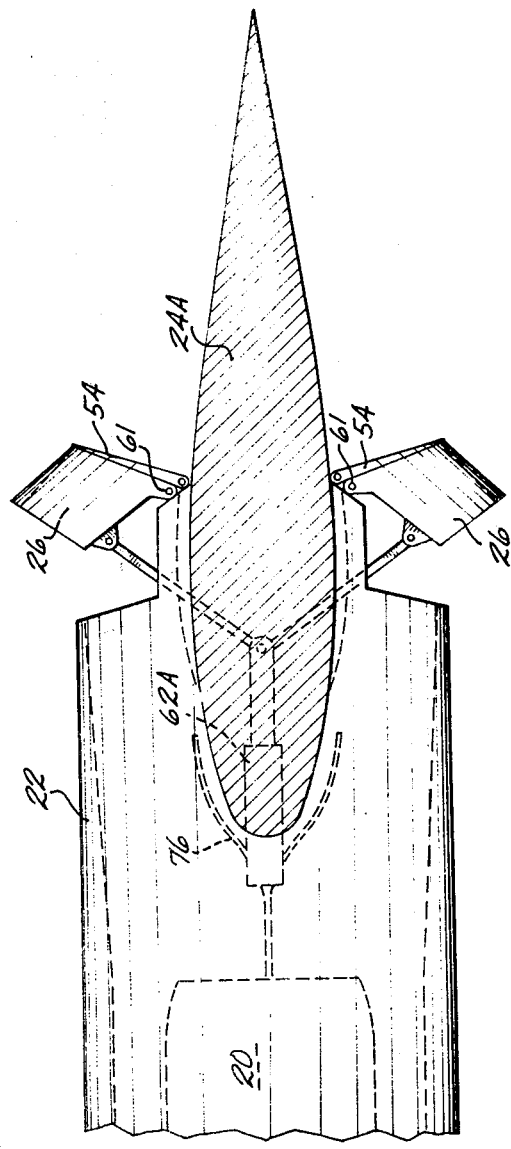

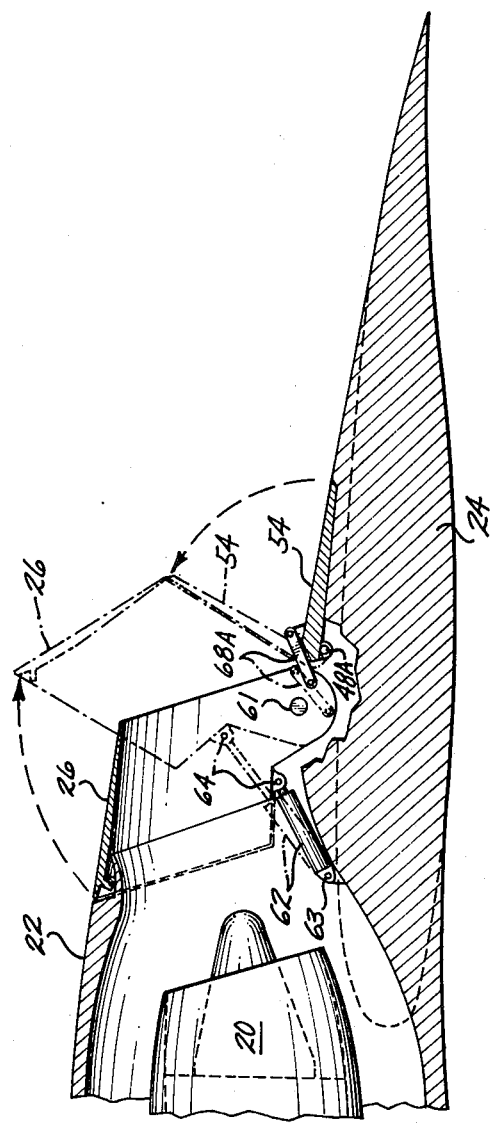

VARIABLE RAMP EXHAUST NOZZLE AND CLAMSHELL REVERSER

This is a division of application Ser. No. 365,933, filed June 1, 1973 now U.S. Pat. No. 3,844,482.

SUMMARY OF THE INVENTION

The invention relates to an apparatus for varying the exhaust nozzle area and for reversing the thrust flow from a jet engine enclosed in a nacelle. The nacelle is mounted forward and above on the wing of an aircraft and discarhges the discharges exhaust flow through a D-shaped nozzle exit and over the upper surface of the wing.

For varying the exhaust nozzle area, a variable ramp is utilized. The ramp is vertically adjustable and comprises three segments, which form the lower surface of the D-shaped exhaust duct. The ramp extends from within the duct to beyond the nozzle exit and provides for a smooth transitional flow of the exhaust gases over the upper surface of the wing. At the slower aircraft speeds, such as for takeoff and landing, the ramp segments are positioned at their lower position for providing the maximum exhaust nozzle area to attenuate the exhaust noise and to form the low speed exhaust nozzle for improved thrust efficiency. At the higher aircraft cruise speeds, the ramp segments are raised to their upper position to decrease the exhaust nozzle exit area for increasing the thrust efficiency of the nozzle.

For reversing the thrust, a clamshell panel, which forms the aft upper portion of the exhaust nozzle, is pivoted downward to cooperate with an aft ramp segment that is swung upward against the clamshell panel and thereby forms a clamshell blocker door arrangement to block the exhaust flow and deflect it upward and forward over the nacelle and wing. This arrangement provides a much better turning surface geometry for increasing the effectiveness of the thrust reversal.

One of the disadvantages of the conventional thrust reversing mechanisms is that if the elements of the reverser mechanism were to move due to drag forces caused by improper rigging of vibration loosening the connections, they could go into reverse thrust with high power settings in the engine and this could be disastrous. Whereas, in the present invention, the primary thrust reversing element is a blocker panel which becomes highly pressure loaded when in the thrust reversing position such that the normal exhaust thrust flow will maintain it in the down or inoperative position in the event of a malfunction.

The fail safe mode or safety feature of the present invention is that the blocker panel, being the more highly loaded surface of the two primary parts making up the reversing means, will be forced to swing down to an inoperative or neutral position and through its interconnecting linkage arrangement with the clamshell panel, will force the thrust reversing apparatus to its stowed or forward thrust position in the event of an actuator failure.

BRIEF DESCRIPTION OF THE DRAWINGS

FIG. 1 is a side elevational view of a high bypass turbofan engine enclosed in a nacelle and mounted on the wing of an aircraft. The thrust reversing elements comprising the clamshell panel of the aft portion of the nacelle, and the ramp panel are shown in their stowed or retracted position;

FIG. 2 is another embodiment of the invention depicting the variable ramp exhaust nozzle and clamshell reverser in a round duct exhaust nozzle configuration with a ramp-wedge bifurcation forming it into two D-shaped nozzles similar to the single one shown in FIG. 1;

FIG. 7 is another embodiment of the invention in a side elevational view similar to FIG. 1 showing a simple link interconnecting the clamshell panel and the ramp panel.

DESCRIPTION OF THE PREFERRED EMBODIMENTS

Figure 3:
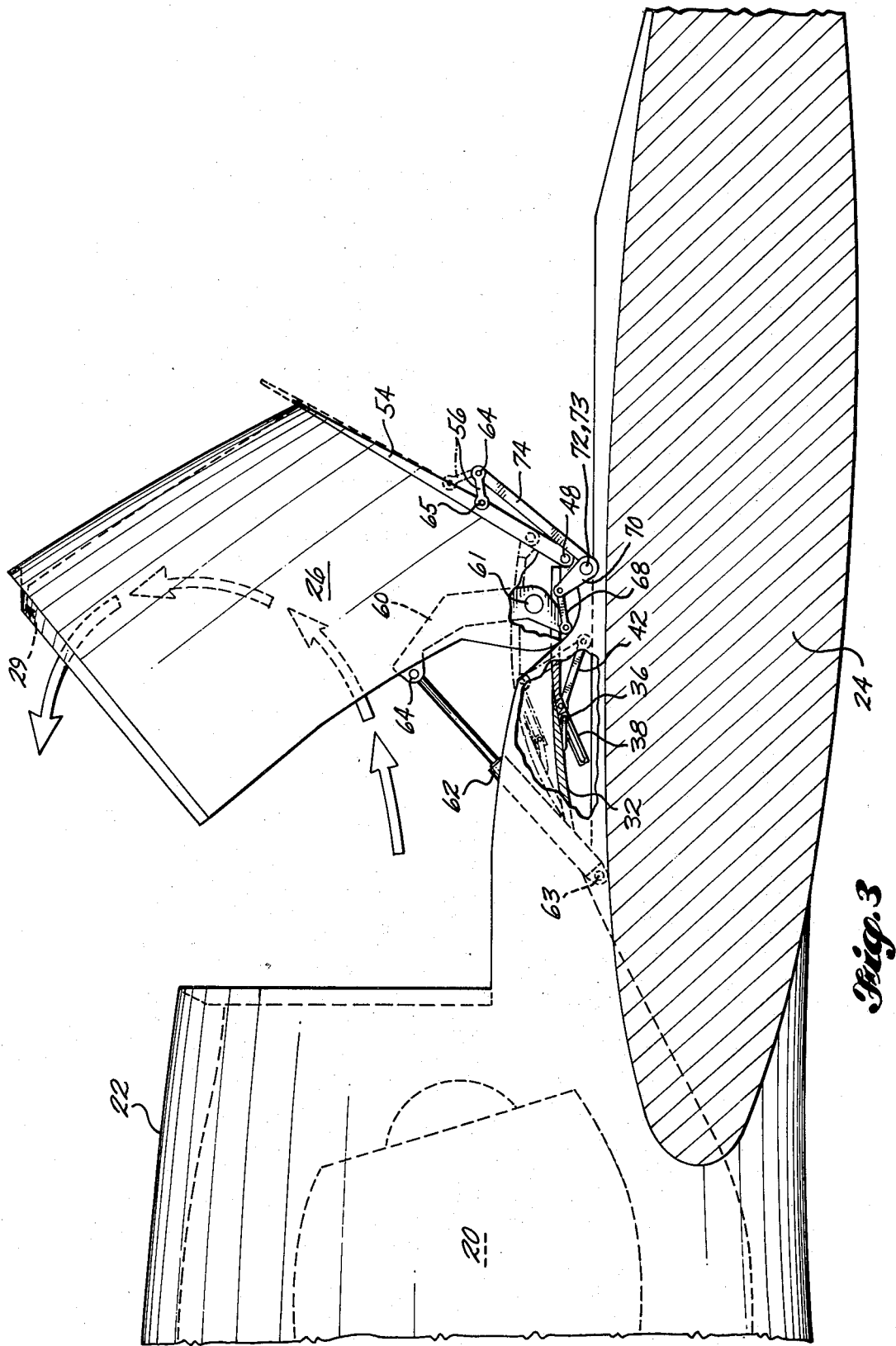
FIG. 3 is an enlarged detail view of the preferred embodiment shown in FIG. 1 and depicts the linkage and actuating mechanism with the clamshell panel and blocker door in the thrust reversing position and the variable ramp, forming the bottom surface of the exhaust nozzle, lowered to the maximum exhaust nozzle area position.

FIG. 1 is a side view of a preferred embodiment of the present invention, showing a high bypass ratio turbofan engine 20 enclosed in a nacelle 22 which is mounted forward and above on an aircraft wing 24 so that the engine thrust flow is discharged aft over the upper surface of the wing. The wing 24 provides a sound deflecting shield against the downward radiation of the sound waves from the engine exhaust nozzle; thereby reducing the ground noise. The nacelle 22 is mounted on the wing 24 such that its exhaust duct configuration forms a D-shaped exhaust nozzle exit with the upper surface of the wing. The wall of the nacelle exhaust duct, at its aft end, forms an outer clamshell panel 26 of the thrust reversing apparatus. The clamshell panel 26 is mounted for pivotal rotation about an axis 61 transverse to the engine thrust line and adjacent to the upper surface of the wing 24 so that as the clamshell panel 26 pivots aft from its stowed or retracted position, it leaves an opening in the upper duct wall through which the exhaust flow can be directed; provided, however, that a blocker panel 54 normally stowed downstream of the nozzle exit and pivotally mounted adjacent thereto, is rotated upwardly for flow blockage in combination therewith. The blocker panel 54 forms the aft segment of a vertically adjustable three segmented surface or variable ramp 30 that forms the lower surface of the exhaust nozzle duct. The operating mechanism of the clamshell panel 26 and the variable ramp 30 is more clearly shown in the enlarged detail views of FIGS. 3–6.

Figure 6:
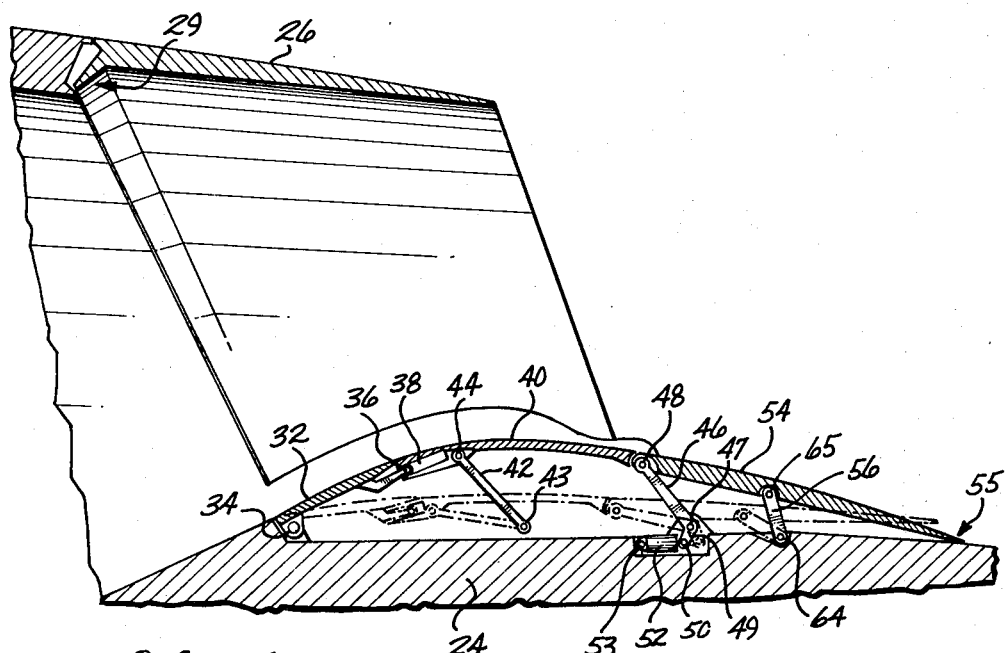
FIG. 6 is a side section view taken along line 6—6 of FIG. 5.

FIG. 6 shows the variable ramp 30 connected to structure on the upper surface of the wing 24 through a linkage support mechanism for raising and lowering the three segmented ramp. The forward ramp segment 32 is hinged at 34 to fixed wing structure, and supported at its aft end on slide block 36 which is inserted in track fitting 38 mounted to the mid ramp segment 40. The mid ramp 40 is connected to wing structure through a parallel linkage mechanism comprising: a forward support link 42 having one end pivotally connected at 43 to fixed wing structure and the other end pivotally connected at 44 to the forward portion of the mid ramp 40; and an aft drive link 46 connected at 47 to fixed wing structure and at 48 to the aft portion of the mid ramp 40. Also, the aft drive link 46 has an arm 49 pivotally connected at 50 to the ramp actuator 52, which in turn is connected to fixed structure at 53. The aft ramp segment 54 is pivotally supported at 48 on its forward end by the drive link 46, and at its mid point by a link 56 which through its interconnection with the thrust reversing mechanism, swings the aft ramp section 54 up into a flow blockage position to cooperate with the clamshell panel 26 in forming a clamshell blocker door arrangement for reversing the exhaust flow as will more clearly be described infra with reference to FIG. 3. When the ramp linear actuator 52 is in an extended position, the three ramp segments 32, 40 and 54 are at their lowered position as shown in phantom. During low speed flight of the airplane, such as takeoff and landing, or to increase the exhaust nozzle opening for the sound suppression mode of airplane operation, the ramp 30 is in its lowered position. During cruise flight speeds of the airplane, the exhaust nozzle exit area is decreased for increased efficiency by retracting the linear ramp actuator 52; thereby, rotating the drive link 46 clockwise about the fixed pivotal point 47 and raising the ramp segments. With the trailing edge 55 of the aft ramp segment 54, in its fully down position a smooth transitional flow over the ramp surface with the top surface of the wing 24 is provided for attached exhaust fluid flow when the ramp 30 is in the raised cruise position. When the ramp 30 is lowered to its low speed position, the trailing edge 55 is lifted off the wing surface or a space is provided therebetween for separating or unattaching the exhaust fluid flow from the upper surface of the wing to improve the acoustic shielding characteristics of the wing. However, if desired and with minor mechanism geometry modification (not shown), the aft ramp trailing edge 55 could also be positioned flush with the upper surface of the wing at the lowered low speed position of the ramp 30 to permit attached exhaust fluid flow for minimum drag and increased lift from the high velocity exhaust flow over the upper wing surface.

Figure 4:
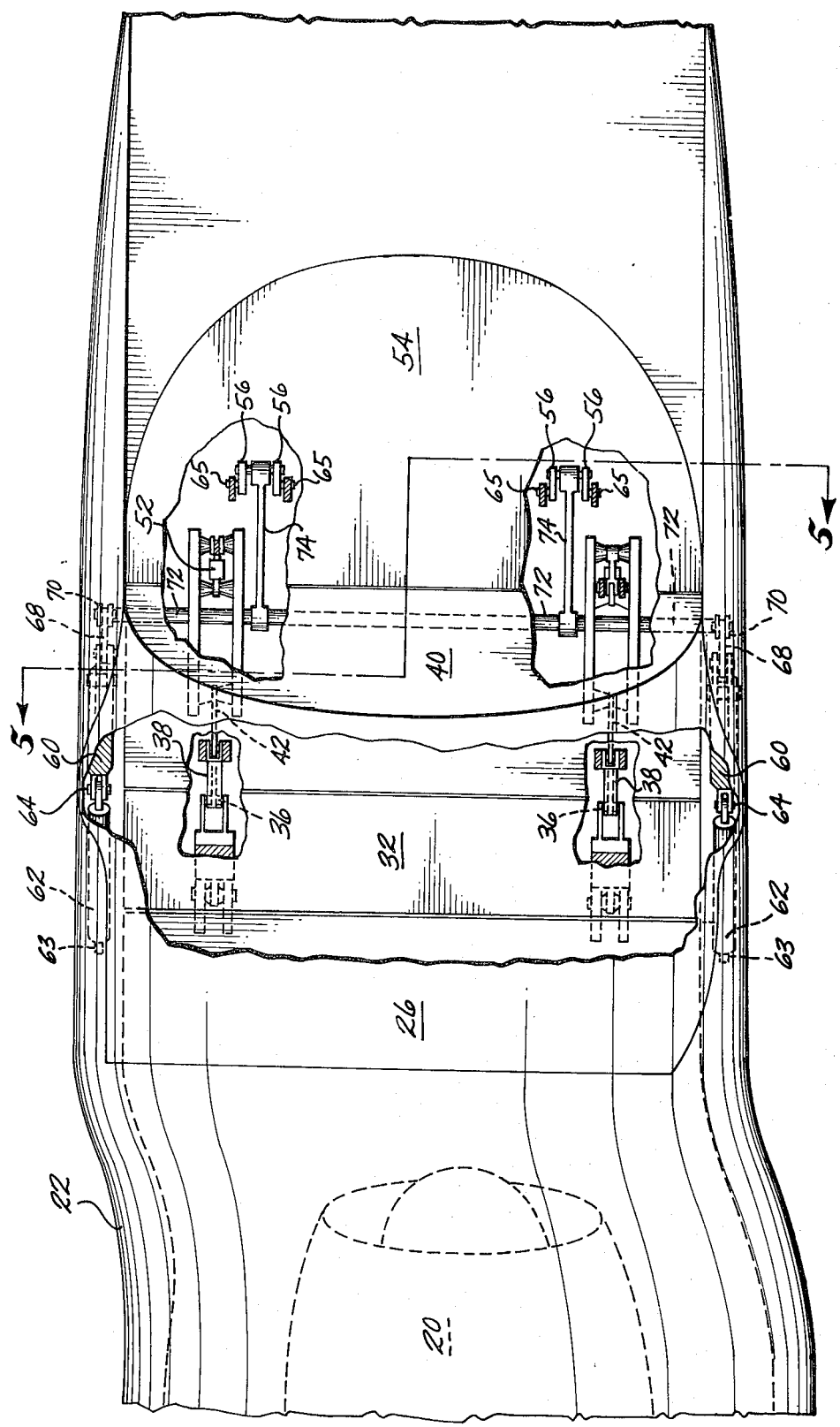
FIG. 4 is a plan view of FIG. 3 with the clamshell panel and blocker door in their retracted or non-reversing position.
Figure 5:
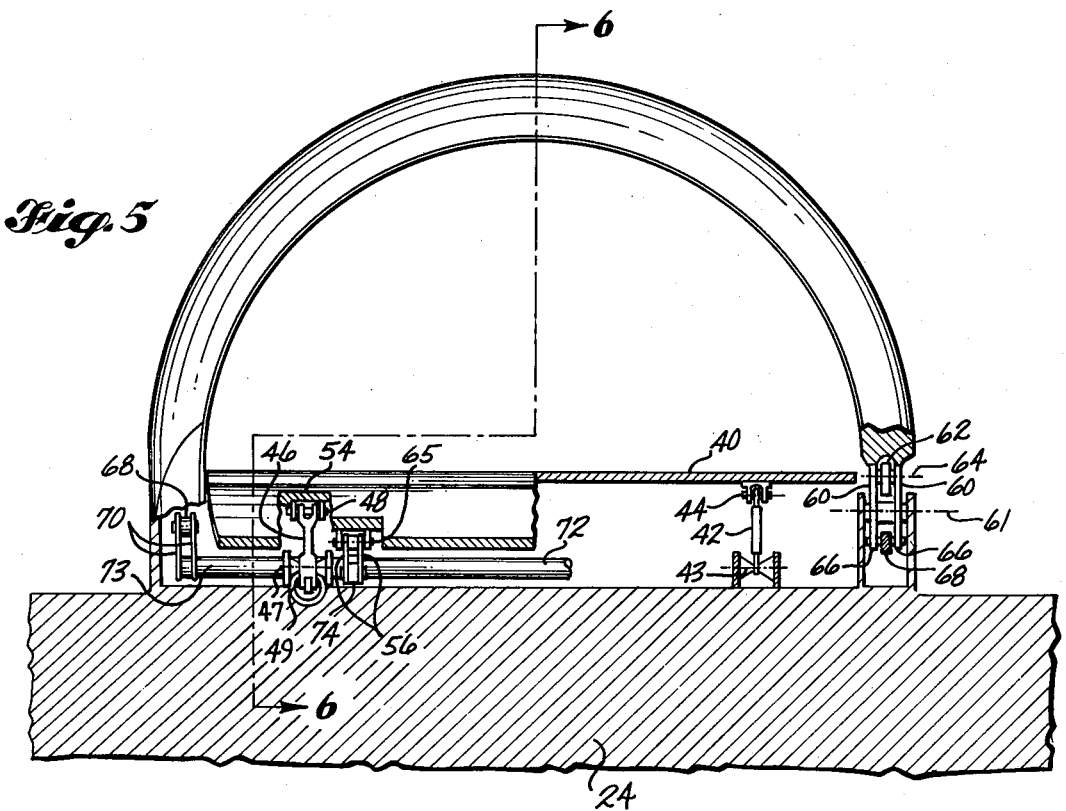
FIG. 5 is a rear view of FIG. 3 taken along the line 5—5.

FIGS. 3, 4, and 5 show in greater detail the reverser mechanism and its operation. The reverser is situated in the aft end of the engine overwing nacelle and comprises a horseshoe or clamshell shaped panel 26 which forms the wall and upper structure of the D-shaped exhaust nozzle and duct. The clamshell panel 26 is fixedly mounted on hinge fitting 60 which in turn is pivotally mounted for rotation about a fixed structural axis 61. The clamshell panel 26 is rotated aft to its thrust reversing position by a linear actuator 62 which is connected to fixed structure at 63 and to the clamshell panel 26, at 64. When the linear actuator 62 is extended, it swings the clamshell panel 26 aft about its axis 61 and in so doing, rotates a driver arm 66, which is also fixed to the clamshell panel hinge fitting 60, in a clockwise direction when viewed in the side view of FIG. 3. This will induce, through an interconnecting link 68, a counterclockwise rotation to a first driven arm 70. The arm 70 is fixedly mounted on a torque tube 72, which is in parallel alignment with hinge axis 61, and which torque tube 72 is pivotally mounted for rotation about a fixed structural axis 73. Also, fixed to torque tube 72 is a second driven arm 74, which in combination with the first driven arm 70 forms a bell crank arrangement. The second driven arm 74, is pivotally connected at 64 to one end of the link 56 interconnecting the aft ramp segment 54 to rotate it about its forward pivotal connection 48 in a counter-clockwise direction, as shown in FIG. 3, such that the aft ramp segment 54 will swing up into contact with the aft edge of the clamshell panel 26 thereby forming a clamshell blocker door for reversing the exhaust flow. Around the inner periphery and at the forward edge of the clamshell panel 26, is a lip 29, which improves the turning action of the exhaust gases to increase the efficiency of thrust reversal. In a reverse thrust deflector configuration, just by adding a small vane or lip member 29, even though as shown in the figures as not having much surface, just a few inches makes a considerable difference in improving the efficiency of the flow turning effect.

Referring to FIGS. 3 and 6: the relationship of point 64 (the pivotal connection between driven link 74 and link 56); and point 65 (the pivotal connection between link 56 and aft ramp segment 54); is such that the aft ramp segment 54 will be swung up into contact with the clamshell panel 26 regardless of the operative position of the variable ramp 30. Due to the interconnecting linkage mechanism between the clamshell panel 26 and the aft ramp segment 54, as the two surfaces come together to form the thrust reversal configuration, the pressure loads build up on the aft ramp segment 54, thereby tending to force the reverser mechanism into the stowed or non-reversing position. This then provides for failsafe reverser operation independent of the variable exhaust nozzle area function of the ramp 30, which could be in the cruise or low speed position, or jammed in any position in between. So that, if the actuation system or the actuators were to lose power, the surfaces would float back into their forward thrust condition because the flap ramp would be a highly loaded surface that would definitely override any loads on the clamshell panel 26 and cause it to tilt forward towards its retracted position. Whereas, if the clamshell panel 26 were tilted aft so that it rested entirely onto the upper surface of the wing, it would not only be less efficient flow turning geometry arrangement, but also an unsafe reverse thrust condition in that if actuation power were to be lost, the clamshell panel could not be tilted forward into the forward thrust condition.

FIG. 2 is another embodiment of the invention wherein the exhaust duct is round and bifurcated by a heat shield 76 and an aerodynamic surface 24A, to form two D-shaped exhaust nozzles which are similar in configuration to the single one of the preferred embodiment. However, with respect to the actuators, a single actuator 62A could be used for both of the clamshell panels, as shown in the figure, for synchronizing the reverser actuation on both sides. Also, in a similar manner (not shown) a single actuator with two links could actuate and synchronize the variable ramps on the bifurcation planes.

FIG. 7 is another embodiment of the invention which is similar in configuration to the previously described preferred embodiment except that the ramp is fixed with the blocker panel 54 pivotally connected at 48A to fixed wing structure and the linkage mechanism interconnecting the clamshell panel 26 with the blocker panel 54 has been simplified to that of a single link 68A.

While the invention has been described in relation to certain embodiments, it is to be understood that those modifications and changes which become obvious to a person of ordinary skill in the art, after reading the foregoing specification and its teachings, are intended to be encompassed in the invention disclosed above and limited only by the definition of the appended claims.

What is claimed is:

1. Apparatus for varying the exhaust nozzle area and reversing the forward thrust of a jet engine mounted in a nacelle positioned forward and above on an aircraft wing so as to form a D-shaped exhaust nozzle exit for flow discharge over the upper wing surface comprising: a clamshell panel forming the aft semi-circular portion of the D-shaped exhaust nozzle; a ramp comprising segments forming the flat surface of the D-shaped exhaust nozzle fore and aft of the nozzle exit plane over the upper surface of the wing; means for raising and lowering the ramp to vary the exhaust nozzle area; an aft ramp segment rearwardly disposed from the exhaust nozzle and being pivotally adjustable to an upward position; and means operating independently of the ramp raising and lowering means, for pivoting the clamshell panel aft and downward toward the upper surface of the wing in combination with raising the aft ramp segment from the upper surface of the wing to an abutment relation with the clamshell panel to form a clamshell blocker door arrangement for reversing the exhaust flow.

2. The apparatus as set forth in claim 1, comprising: a flow turning vane attached around the periphery of the forward edge of the clamshell panel to improve the flow turning geometry arrangement and the reverse thrust efficiency.

3. The apparatus as set forth in claim 1, comprising: means for positioning the trailing edge of the aft ramp segment flush with the upper surface of the wing so as to provide a smooth transitional surface for attached flow in the high speed cruise operation of the aircraft, and for raising the trailing edge of the aft ramp segment off of the upper surface of the wing so as to provide unattached flow over the upper surface of the wing for improving the acoustic shielding characteristics in the low speed takeoff and landing operation of the aircraft.

4. The apparatus as set forth in claim 1, wherein: said ramp segments, when in the lowered position, provide an upper wing surface contour which produces a maximum exhaust nozzle area for attenuating the exhaust noise; and said segments, when in the raised position, produce an upper wing surface contour which substantially reduces the area of the exhaust nozzle for providing acceptable specific fuel consumption and engine cycle requirements at high altitude and high speed cruise mode of aircraft operation.

* * * * *